United States Patent
Pandey et al.

(10) Patent No.: US 8,171,541 B2
(45) Date of Patent: May 1, 2012

(54) ENABLING PROVIDER NETWORK INTER-WORKING WITH MOBILE ACCESS

(75) Inventors: Ravi Pandey, Masala (FI); Roman Pichna, Espoo (FI); Zexian Li, Espoo (FI)

(73) Assignee: Nokia Corporation, Espoo (FI)

( * ) Notice: Subject to any disclaimer, the term of this patent is extended or adjusted under 35 U.S.C. 154(b) by 783 days.

(21) Appl. No.: 11/958,967

(22) Filed: Dec. 18, 2007

(65) Prior Publication Data

US 2009/0158398 A1 Jun. 18, 2009

(51) Int. Cl.
*G06F 15/16* (2006.01)
*G06F 9/00* (2006.01)

(52) U.S. Cl. .................................. 726/15; 726/4
(58) Field of Classification Search .......... 726/4, 15
See application file for complete search history.

(56) References Cited

U.S. PATENT DOCUMENTS

| | | | |
|---|---|---|---|
| 6,614,809 B1 | 9/2003 | Verma et al. | |
| 7,237,260 B2 * | 6/2007 | Yu et al. | 726/11 |
| 2002/0069278 A1 * | 6/2002 | Forslow | 709/225 |
| 2002/0169847 A1 * | 11/2002 | Luna et al. | 709/216 |
| 2003/0110288 A1 * | 6/2003 | Ramanujan et al. | 709/238 |
| 2003/0182431 A1 * | 9/2003 | Sturniolo et al. | 709/227 |
| 2004/0066769 A1 | 4/2004 | Ahmavaara et al. | |
| 2004/0139201 A1 | 7/2004 | Chaudhary et al. | |
| 2004/0148430 A1 * | 7/2004 | Narayanan | 709/238 |
| 2005/0237969 A1 * | 10/2005 | Jung et al. | 370/328 |

FOREIGN PATENT DOCUMENTS

| | | |
|---|---|---|
| EP | 1650999 A1 | 4/2006 |
| WO | 2009/077996 A1 | 6/2009 |

OTHER PUBLICATIONS

"Part 16: Air Interface for Fixed Broadband Wireless Access Systems", IEEE Standard for Local and Metropolitan Area Networks 2004, 1-895.
"Part 16: Air Interface for Fixed and Mobile Broadband Wireless Access Systems; Amendment 2: Physical and Medium Access Control Layers for Combined Fixed and Mobile Operation in Licensed Bands", IEEE Standard for Local and Metropolitan Area Networks 2006, 1-864.
Aboba, B. et al., "Extensible Authentication Protocol (EAP)", Network Working Group, Request for Comments, Category: Standards Track; The Internet Society Jun. 2004, 1-68.
Aboba, B. et al., "The Network Access Identifier", the Network Working Group; Request for Comments, Category: Standards Track; The Internet Society Dec. 2005, 1-17.
Droma, R. et al., "Dynamic Host Configuration Protocol", Network Working Group, Request for Comments, Category: Standards Track; Bucknell University Mar. 1997, 1-46.

(Continued)

*Primary Examiner* — Philip Chea
(74) *Attorney, Agent, or Firm* — Brake Hughes Bellerman LLP

(57) ABSTRACT

Various example embodiments are disclosed herein. In an example embodiment, a method may comprise authenticating a subscriber based upon one or more messages received from a subscriber equipment, via an Access Network Gateway (ANG); sending an access authorization message to the ANG authorizing the subscriber equipment; and wherein the access authorization message includes an address of a tunnel endpoint node and a tunnel method identifier (ID) to be used by the ANG to establish a tunnel between the ANG and the tunnel endpoint node for the subscriber equipment.

21 Claims, 8 Drawing Sheets

OTHER PUBLICATIONS

"Part 16: Air Interface Broadband Wireless Access Systems", Draft Standard for Local and Metropolitan Networks, LAN/MAN Standards Committee of the IEEE Computer Society and IEEE Microwave Theory and Techniques Society, IEEE WirelessMAN 802.16, P802.16Rev2/D0b, Jun. 27, 2007, pp. 1-1754.

International Search Report and Written Opinion for International Application U.S. Appl. No. PCT/IB2008/055435, mailed May 14, 2009, 14 pages.

"3rd Generation Partnership Project; Technical Specification Group Core Network and Terminals; General Packet Radio Service (GPRS); Gprs Tunneling Protocol (GTP) Across the Gn and Gp Interface (Release 7)", 3GPP TS 29.060, V7.7.0, Sep. 2007, pp. 1-143.

International Preliminary Report on Patentability and Written Opinion for International Application No. PCT/IB2008/055435, Jul. 1, 2010, 15 pages.

* cited by examiner

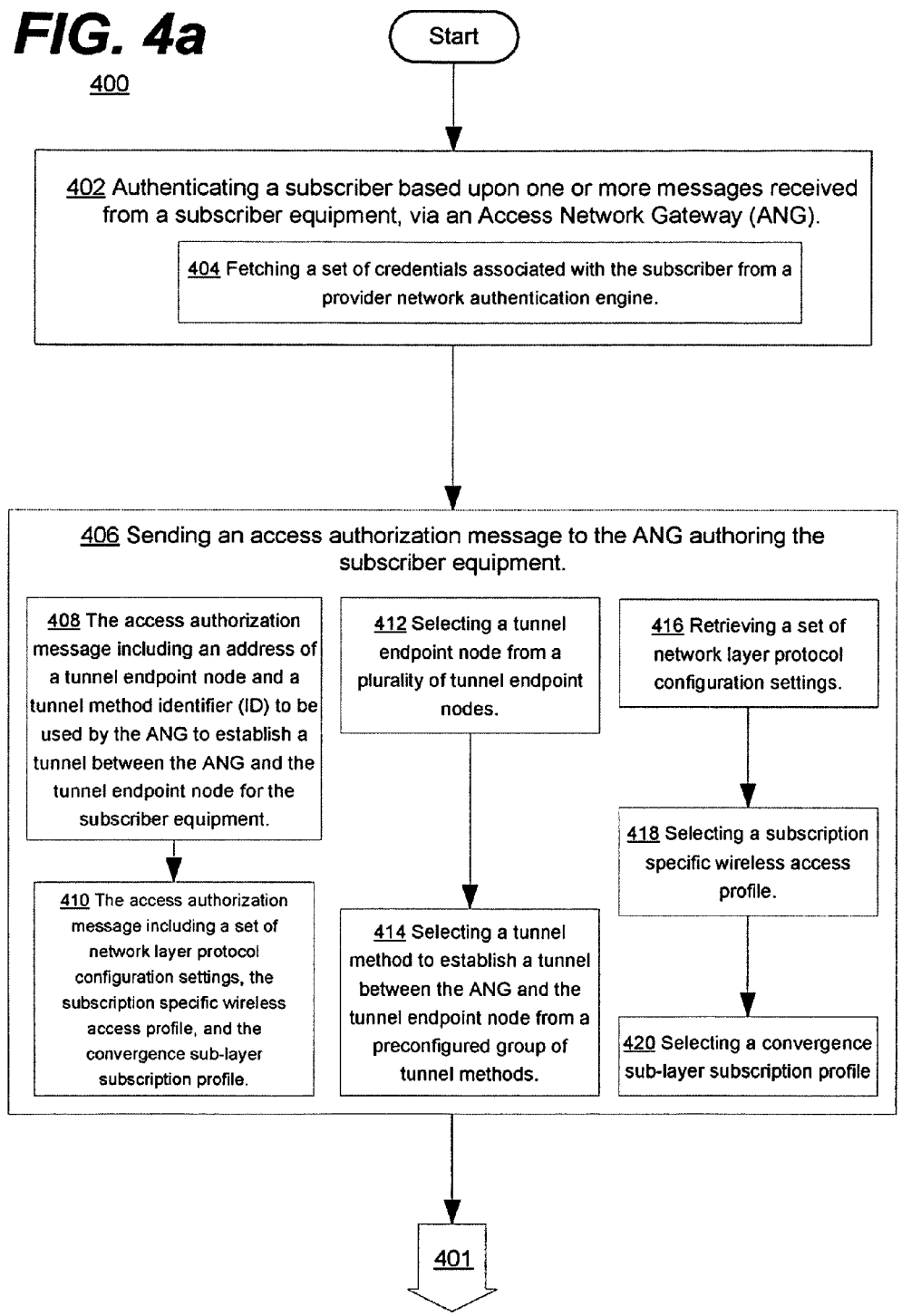

452 Receiving at least one network address and a pseudo-Identifier (ID) from a Access Network Gateway (ANG), wherein the network address is associated with the pseudo-ID.

454 Mapping the network address and the pseudo-Identifier to an actual-Identifier.

456 Receiving an identity request, to identify the subscriber equipment, from a provider network authentication engine.

458 Receiving a query from a provider network authentication engine for the actual-Identifier, wherein the query includes the network address.

460 Providing the identity of the subscriber equipment to the provider network authentication engine.

462 Providing the actual-Identifier to the provider network authentication engine.

End

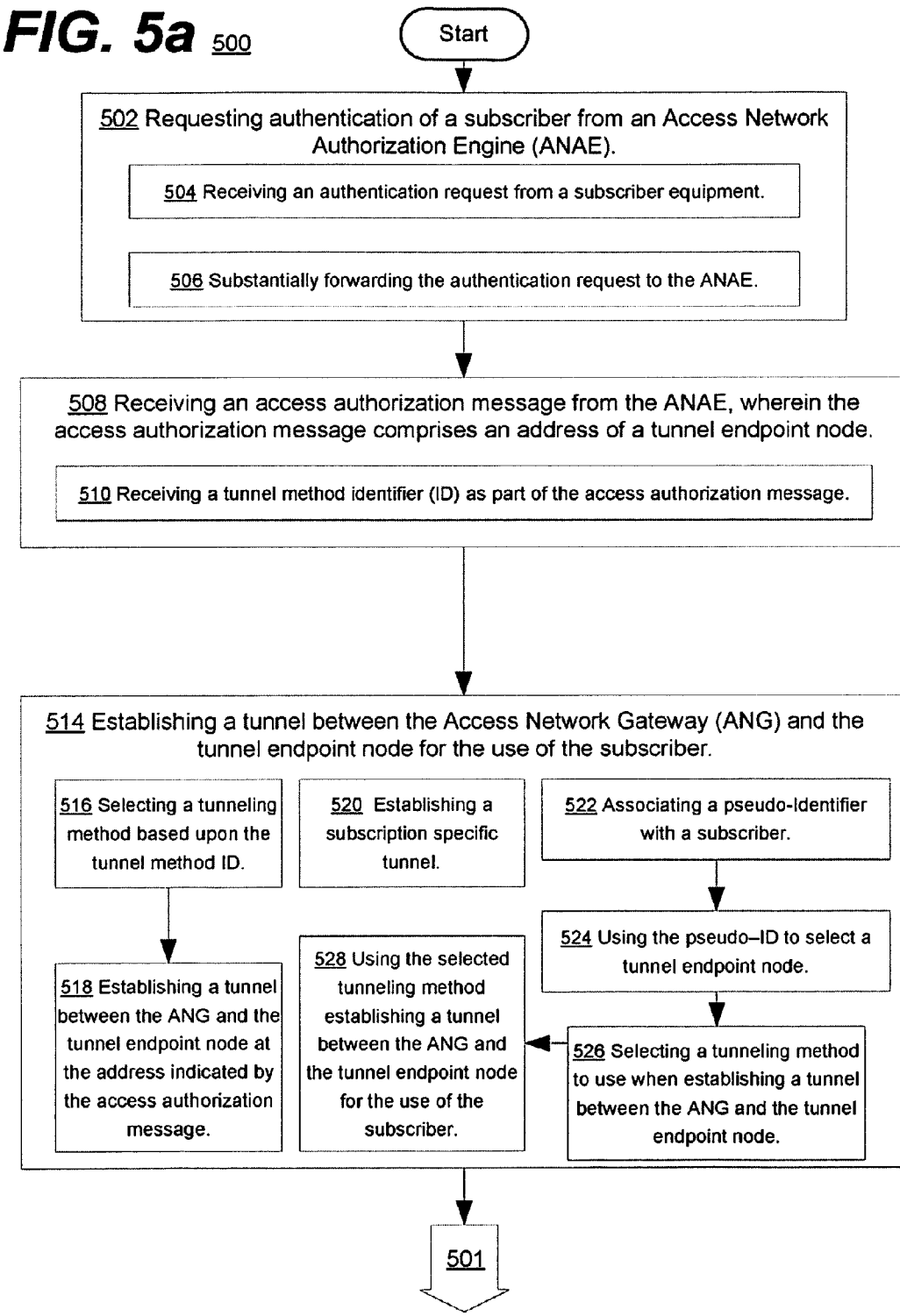

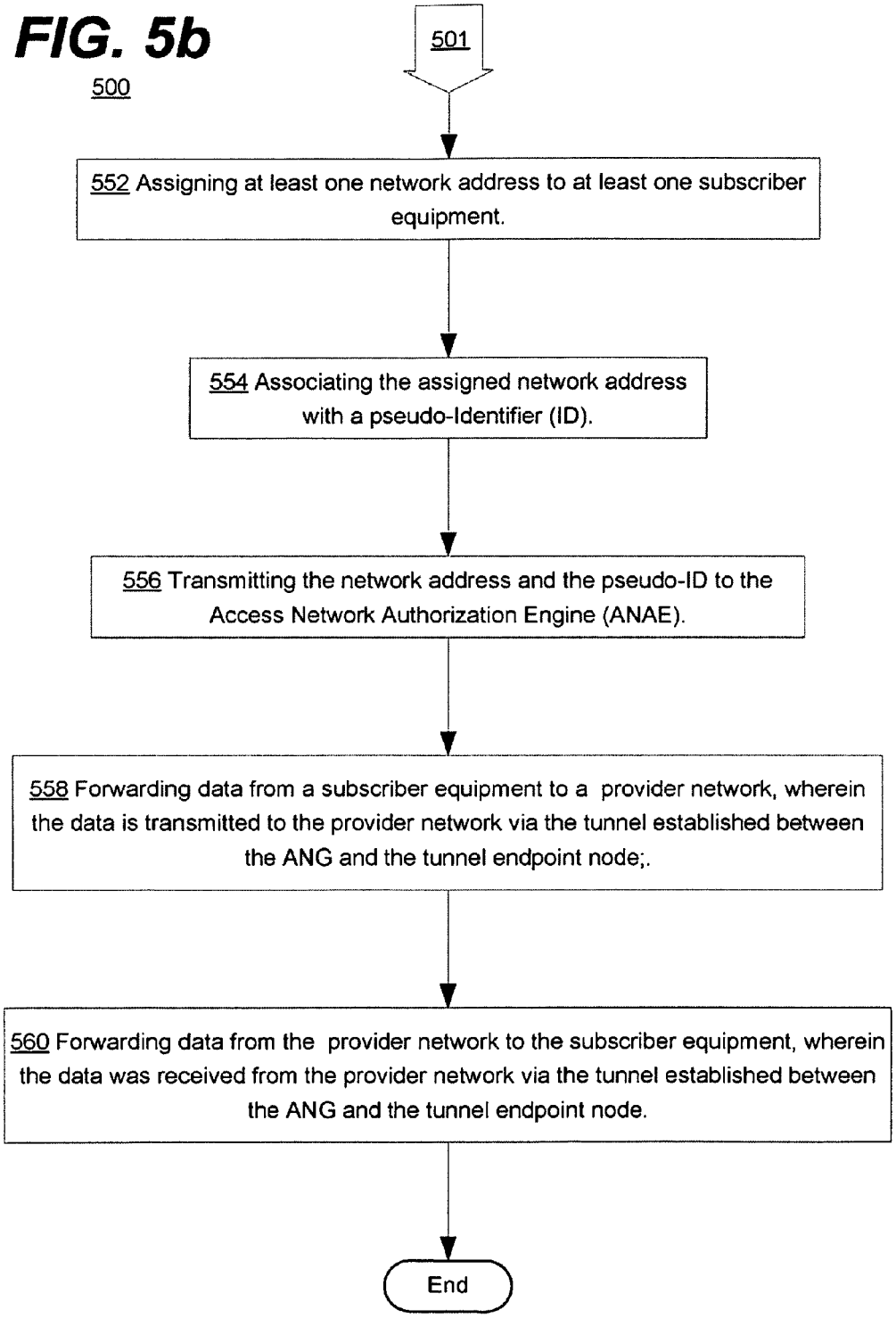

ENABLING PROVIDER NETWORK INTER-WORKING WITH MOBILE ACCESS

TECHNICAL FIELD

This description relates to wireless networks.

BACKGROUND

Typically, network providers (e.g., Internet service providers (ISPs)) operate fixed networks. The provided networks often provide a plurality of services that a subscriber may access as desired. Many of these services may be limited by a usage agreement or by a subscription plan. For example, often users may subscribe to certain bandwidth limitations or to a level of services. As users desire more services, they may increase their subscription levels. For example users may increase their bandwidth limitation or add additional features or services.

Increasingly users or subscribers want to roam or move freely from place to place. As such, the subscriber may move to a location that is not directly serviced by the provider network. For example, a subscriber may directly connect with a provider network from the subscriber's home, but when the subscriber is on a trip or at a restaurant they may not be able to interact with the provider network. In some instances these remote locations may have access to another network. A user may wish to traverse the remote network to access the provider's network. In this context, network traversed to access the provider network may be referred to as an "access network". To access the network the subscriber may use any of a number of devices, such as, for example, a cell phone, a personal digital assistant (PDA), a laptop computer, a desktop computer, etc.; although, it is understood that the above are merely a few illustrative examples to which the disclosed subject matter is not limited.

SUMMARY

According to an example embodiment, a method may comprise authenticating a subscriber based upon one or more messages received from a subscriber equipment, via an Access Network Gateway (ANG); sending an access authorization message to the ANG authorizing the subscriber equipment; and wherein the access authorization message includes an address of a tunnel endpoint node and a tunnel method identifier (ID) to be used by the ANG to establish a tunnel between the ANG and the tunnel endpoint node for the subscriber equipment.

In another example embodiment, a method of using an Access Network Gateway (ANG) may comprise requesting authentication of a subscriber from an Access Network Authorization Engine (ANAE); receiving an access authorization message from the Access Network Authorization Engine (ANAE), wherein the access authorization message comprises an address of a tunnel endpoint node; establishing a tunnel between the ANG and the tunnel endpoint node for the use of the subscriber.

According to another example embodiment, a system may comprise an Access Network Authorization Engine configured to authenticate a subscriber based upon one or more messages received from a subscriber equipment, provide an access authorization message to an Access Network Gateway (ANG), wherein the access authorization message includes an address of a tunnel endpoint node; and the Access Network Gateway (ANG) configured to establish a tunnel between the ANG and the tunnel endpoint node for the use of the subscriber.

The details of one or more implementations are set forth in the accompanying drawings and the description below. Other features will be apparent from the description and drawings, and from the claims.

BRIEF DESCRIPTION OF THE DRAWINGS

FIG. 4 is a flow chart illustrating the operation of an Access Network Authorization Engine in accordance with the disclosed subject matter.

FIG. 5 is a flow chart illustrating the operation of an Access Network Gateway in accordance with the disclosed subject matter.

DETAILED DESCRIPTION

Figure 1:
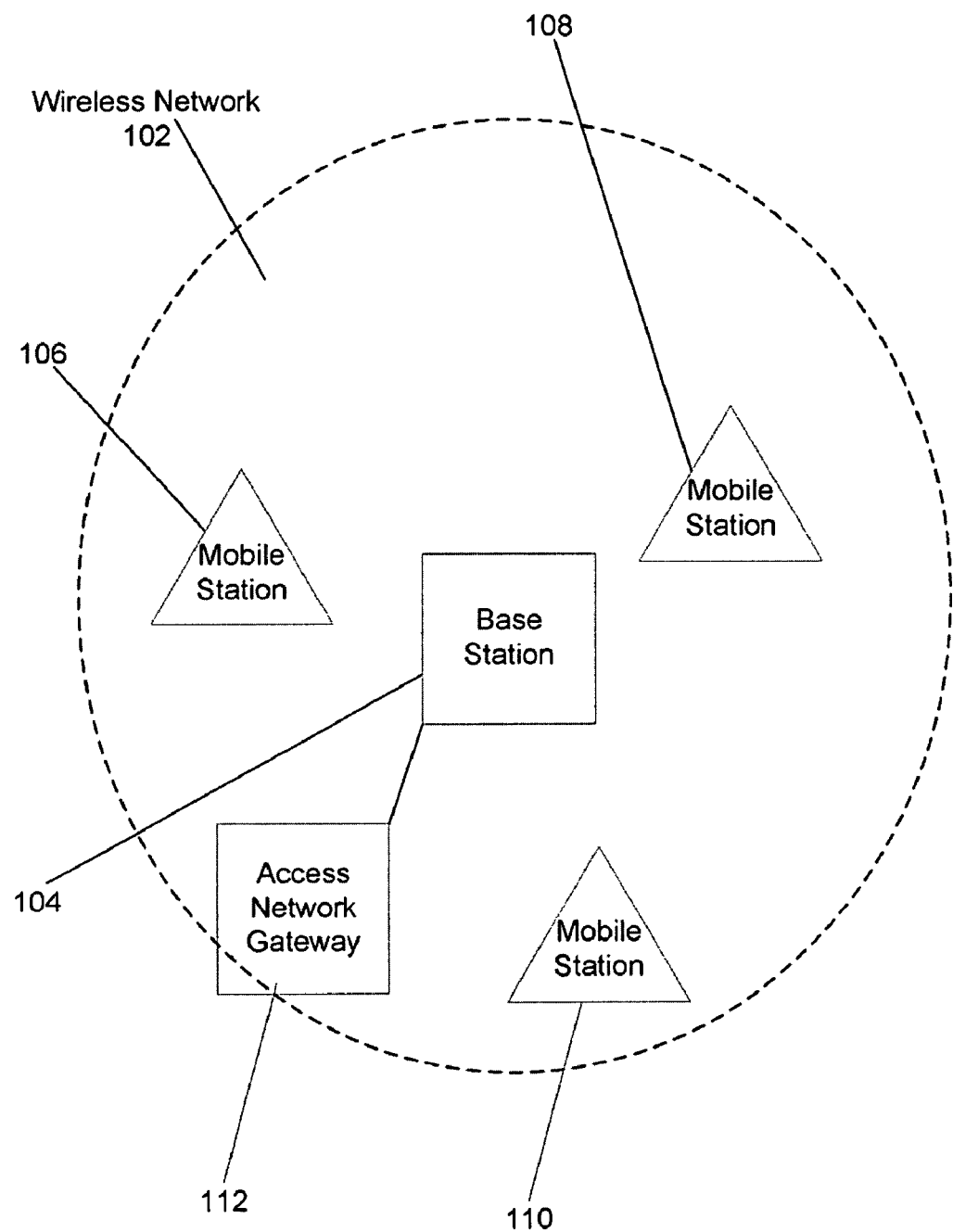
FIG. 1 is a block diagram of a wireless network according to an example embodiment.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink direction to BS 104, and may receive data in a downlink direction from BS 104, for example. Although only one BS 104 and three mobile stations (MS 106, 108 and 110) are shown, any number of base stations and mobile stations may be provided in network 102. Also, although not shown, mobile stations 106, 108 and 110 may be coupled to base station 104 via relay stations or relay nodes, for example. An access network controller or gateway 112 may be coupled to the base stations (e.g., BS 104) via wired or wireless links. In an example embodiment, access network gateway 112, if present, may provide control for one or more network tasks or functions, either for or in cooperation with one or more base stations in network 102. Although not shown, access network gateway 112 and base station 104 may each be connected to a wired network, such as a Local Area Network, a Wide Area Network (WAN), the Internet, etc.

Figure 2:
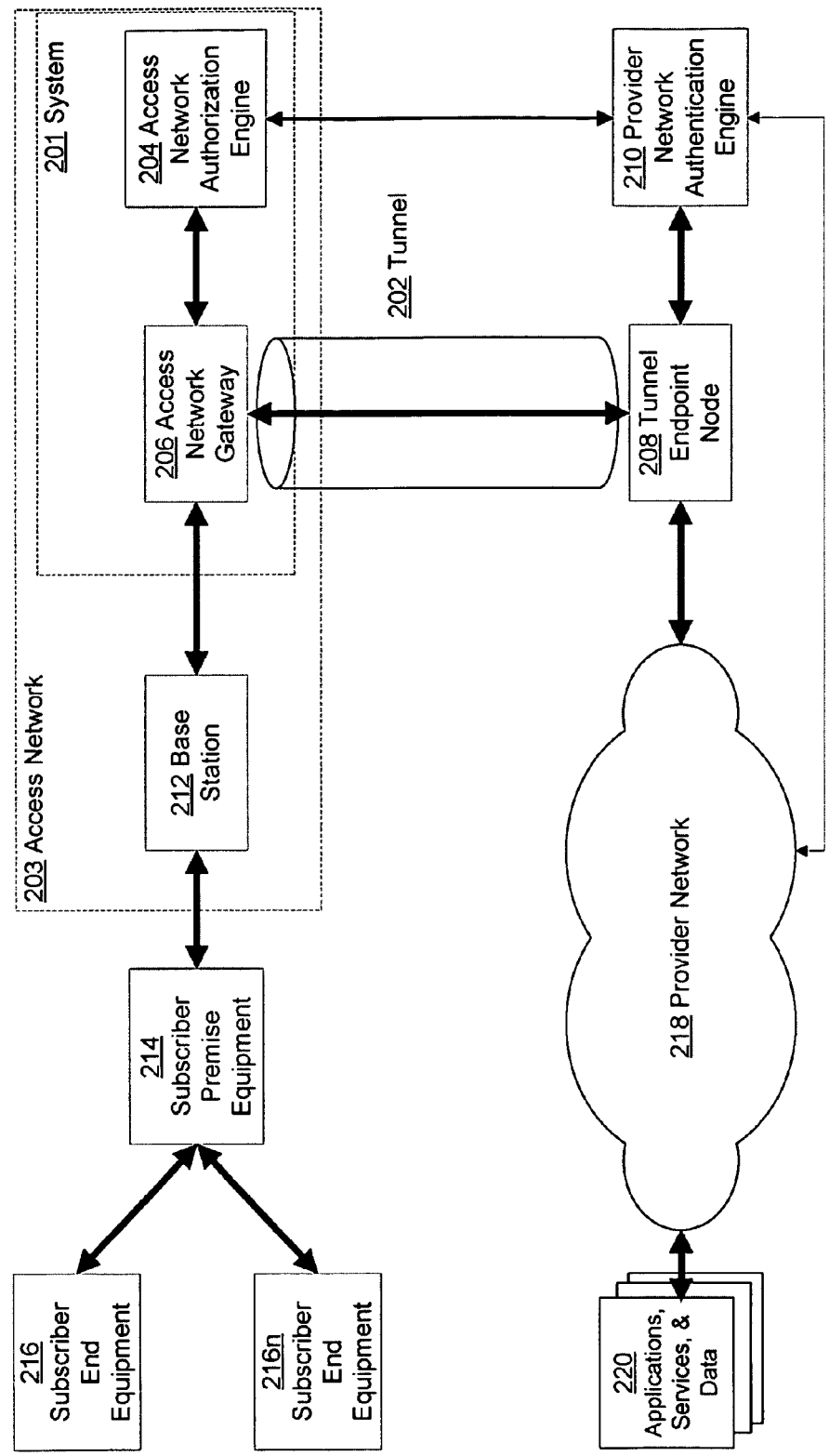
FIG. 2 is a block diagram illustrating a system in accordance with the disclosed subject matter.

FIG. 2 is a block diagram illustrating a system in accordance with the disclosed subject matter. In one embodiment, the system 201 may include an access network gateway (ANG) 206 and an access network authorization engine (ANAE) 204. In one embodiment, the ANG 206 may be configured to establish a tunnel 202 between the ANG 206 and a tunnel endpoint node 298 for the use of a subscriber. In one embodiment, a system 200 may include some or all of a plurality of subscriber end equipment (SEE) 216 and 216n, a subscriber premise equipment (SPE) 214, a base station (BS) 212, the system 201, a tunnel or special routing rules 202, a tunnel endpoint node (TEN) 208, a provider network authentication engine (PNAE) 210, a provider network (PN) 218, and a plurality of applications, services and data 220. In one embodiment, an access network (AN) 203 may include a base station 212, an ANG 206, and an ANAE 204.

An illustrative embodiment showing a possible usage, capabilities, and configurations of the systems, to which the disclosed subject matter is not limited, is described below. The functions, configurations, and capabilities of the above elements are described below in a substantially chronological fashion in relation to the illustrative embodiment of the disclosed subject matter.

In various embodiments, a subscriber or subscriber end equipment 216 may request access to a provider network 218 and, in one embodiment, a selection of any applications, services, and/or data 220 coupled with or part of the provider network 218. In one embodiment, the provider network 218 may include an Internet Service Provider (ISP) network, or a retail provider. In some embodiments, the subscriber may make payments to the owner(s) of the provider network 218 and the access network 203.

In one embodiment, the subscriber may attempt to access the provider network 218 using an access network 203. In some embodiments, portions or the entire access network 203 may include wireless networks (e.g., wireless network 102 of FIG. 1). In such an embodiment, the link or connection between the base station 212 and the subscriber premise equipment 214 may be substantially wireless. In one embodiment, the access network 203 may include a WiMAX (Worldwide Interoperability for Microwave Access) based network that is substantially incompliance with the IEEE 802.16 standards, their derivatives, siblings, or predecessors. Institute of Electrical and Electronics Engineers, *IEEE Standard for Local and Metropolitan Area Networks, Part* 16, IEEE Std. 802.16-2004. In one embodiment, the access network 203 may include a wholesale provider or, in one embodiment, a reseller of network access.

In one embodiment, the SPE 214 may be the head-end or edge switch for an enterprise network controlled by the subscriber. In another embodiment, the SPE 214 may be a gateway (possibly under third party control) used by the SEE 216 to access the access network 203 and eventually the provider network 218. In various embodiments, the SEE 216 may be any of a number of devices, such as, for example, a cell phone, a personal digital assistant (PDA), a laptop computer, a desktop computer, etc.; although, it is understood that the above are merely a few illustrative examples to which the disclosed subject matter is not limited.

As mentioned above, in various embodiments, a subscriber or subscriber end equipment 216 may request access to a provider network 218. In one embodiment, the ANG 206 may be configured to establish a tunnel 202 between the ANG 206 and the tunnel endpoint node 208 for the use of the subscriber. In such an embodiment, the tunnel 202 may facilitate access to the provider network 218 by the subscriber. In one embodiment, the ANG 206 may perform an authentication of the subscriber or subscriber equipment on to the access network 203. In some embodiments, this authentication may apply to the SEE 216 or, in other embodiments, merely to the SPE 214. In one embodiment, the ANG 206 may request authentication of a subscriber from an Access Network Authorization Engine 204.

In one embodiment, the Access Network Authorization Engine 204 may be configured to authenticate a subscriber based upon one or more messages received from subscriber equipment and provide an access authorization message to an Access Network Gateway 206. In one embodiment, the ANAE 204 may be configured to authenticate a subscriber by fetching a set of credentials associated with the subscriber from a Provider Network Authentication Engine (PNAE) 210.

In one embodiment, the ANAE 204 may include a WiMAX Authentication, Authorization and Accounting (AAA) framework. In one embodiment, the PNAE 210 may include an ISP AAA framework. In such an embodiment, an AAA framework may include an access control, policy enforcement, and auditing framework for computing systems. In such an embodiment, Authentication may refer to the confirmation that a subscriber is a valid user of the network services requested. Authorization may refer to granting of specific services (including possibly no services) to a subscriber. And, in this context, Accounting may refer to tracking the subscriber's usage of the services.

In one embodiment, the ANAE 204 may be configured to provide an access authorization message to the ANG 206 that includes an address of a tunnel endpoint node 208. In other embodiments, the access authorization message may include a tunnel method identifier (ID) to be used by the ANG 206 to establish a tunnel 202 between the ANG 206 and the tunnel endpoint node 208 for the subscriber equipment. In one embodiment, the tunnel endpoint node 208 may include an ISP gateway.

In various embodiments, the ANAE 204 may be configured to select a tunnel endpoint node 208 from a plurality of tunnel endpoint nodes. In such an embodiment, the tunnel endpoint node 208 may be selected based upon factors, such as, for example, network congestion, latency, a preconfigured preference, locality, etc.; although, it is understood that the above are merely a few illustrative examples to which the disclosed subject matter is not limited.

In some embodiments, the ANAE 204 may be configured to select a tunnel method to establish a tunnel between the ANG 206 and the tunnel endpoint node 208 from a preconfigured group of tunnel methods. In certain embodiments, the tunnel 202 may actually be a virtual private network (VPN) that is created using a set of routing rules. In one embodiment, the tunnel method may include the use of certain network layers (e.g., L3 or the network layer). It is understood that the above are merely a few illustrative examples to which the disclosed subject matter is not limited.

In certain embodiments, the ANAE 204 may be configured to retrieve a set of network layer protocol configuration settings. In some embodiments, the configuration settings may be preconfigured or retrieved from another device. In one embodiment, the ANAE 204 may be configured to select a subscription specific wireless access profile. In such an embodiment, the wireless access profile may limit or restrict how a subscriber may use portions of the access network 203. In some embodiments, the profile may be preconfigured or retrieved from another device. In one embodiment, the ANAE 204 may be configured to select a convergence sub-layer subscription profile. In such an embodiment, a convergence sub-layer may be used to wrap subscriber-level data in an appropriate header and/or footer in order to carry the data within a network. In such an embodiment, the convergence sub-layer may be part of an asynchronous transfer mode (ATM) network. In certain embodiments, the ANAE 204 may be configured to send an access authorization message that comprises the set of network layer protocol configuration settings, the subscription specific wireless access profile, and the convergence sub-layer subscription profile.

In one embodiment, the ANG 206 may be configured to receive an access authorization message from the Access Network Authorization Engine (ANAE) 204, wherein the access authorization message comprises an address of a tunnel endpoint node, as described above. In one embodiment, the access authorization message may also comprise a tunnel method identifier (ID) indicating what technique to use when establishing a tunnel 202 between the ANG 206 and the tunnel endpoint node 208.

In various embodiments, the ANG 206 may be configured to establish a tunnel 202 between the ANG 206 and the tunnel endpoint node 208 for the use of the subscriber or the subscriber equipment. In various embodiments, a tunnel 202 may be a protocol that encapsulates a data payload and acts as a payload protocol. In certain embodiments, a tunnel 202 may be configured to carry a data over an incompatible delivery network or, in other embodiments, to provide a secure path or route through an un-trusted network. In such an embodiment, the tunnel 202 may include a virtual private network (VPN), as described above. In other embodiments, the tunnel 202 may use a point-to-point protocol (PPP). Although, it is understood that the above are merely a few illustrative examples to which the disclosed subject matter is not limited.

In one embodiment, the ANG 206 may be configured to establish a subscription specific tunnel 202. In such an embodiment, the tunnel 202 may limit traffic based not just upon the subscriber or subscriber equipment but also upon the purpose or use of the data attempting to traverse the tunnel 202.

In one embodiment, the ANG 206 may be configured to establish a first unidirectional tunnel from the ANG 206 to the tunnel endpoint node 208, and establish a second unidirectional tunnel from the tunnel endpoint node 208 to the ANG 206. In such an embodiment, the first and second unidirectional tunnels, taken as a whole, may function as a bidirectional tunnel between the ANG 206 and the tunnel endpoint node 208.

In one embodiment, the ANG 206 may be configured to select a tunneling method based upon the tunnel method ID. In various embodiments, the tunnel method ID may be indicated by the ANAE 204. In one embodiment, the ANG 206 may be configured to establish a tunnel 202 using the selected tunnel method.

In various embodiments, a plurality of possible tunnel endpoint nodes 208 may exist. In one embodiment, the ANG 206 may be configured to establish a tunnel 202 between the ANG 206 and the tunnel endpoint node 208 at the address indicated by the access authorization message.

In one embodiment, the ANG 206 may be configured to associate a pseudo-identifier (ID) with a subscriber or subscriber equipment. In various embodiments, this pseudo-ID may include a temporary value, in some cases, selected essentially at random. In some embodiments, the pseudo-ID may be a temporary Network Access ID (NAI). In such an embodiment, the temporary Network Access ID (NAI) may be substantially complaint with the Internet Engineering Task Force Request For Comment (RFC) 4282, its predecessors, or derivatives. The Internet Engineering Task Force: Network Working Group, *The Network Access Identifier*, RFC 4282, December 2005.

In one embodiment, the ANG 206 may be configured to use the pseudo-ID to select a tunnel endpoint node 208. Such an embodiment, the ANG 206 may select from a plurality of tunnel endpoint nodes 208 without using the access authorization message. In such an embodiment, the access authorization message may not identify the tunnel endpoint node 208. After selecting the tunnel endpoint node 208, the ANG 206 may also be configured to select a tunneling method to use when establishing a tunnel between the ANG 206 and the selected tunnel endpoint node 208. In such an embodiment, the access authorization message may not identify the tunnel method. The ANG 206 may be configured to use the selected tunneling method to establish a tunnel between the ANG 206 and the tunnel endpoint node 208.

In one embodiment, the ANG 206 may be configured to check the number of network addresses required by the subscriber equipment. In various embodiments, the mapping of network address to subscriber equipment may include a one-to-one mapping; wherein, in other embodiments the mapping may be one-to-many. In one embodiment, the subscriber equipment may initiate the network address assignment. In one embodiment, the ANG 206 may be configured to request network addresses from a network address server (e.g., server 220) that may be part of or coupled with the provider network 218. In one embodiment, the ANG 206 may be configured to associate or map the network address to a temporary-ID. In one embodiment, the network address may be an address associated with the provider network 218. In one embodiment, the network address may include an Internet Protocol (IP) address.

In one embodiment, the ANG 206 may be configured to forward data from subscriber equipment (e.g., SPE 214 or SEE 216) to a provider network 218 via the tunnel 202. Likewise, in one embodiment, the ANG 206 may be configured to forward data from the provider network 218 to the subscriber equipment (e.g., SPE 214 or SEE 216) via the tunnel 202. In one embodiment, the data may include a network address associated with the provider network 218 and assigned to the subscriber equipment that allows the data to appear as if the subscriber equipment is part of the provider network 218.

In one embodiment, the ANG 206 may be configured to transmit the network address and the pseudo-ID to the Access Network Authorization Engine (ANAE) 204. In such an embodiment, the ANAE 204 may be configured to receive the network address and the pseudo-ID from the ANG 206. In certain embodiments, the ANAE 204 may be configured to map the network address and/or the pseudo-ID to an actual-ID. It is understood that, in one embodiment, a plurality of network addresses and/or pseudo-IDs may be mapped to an actual-ID. In such embodiments, the ANG 206 may be configured to make multiple transmissions or, in other embodiments, a single transmission. In one embodiment, the actual-ID may be a Subscriber Network Access ID (NAI). In such an embodiment, the subscriber Network Access ID (NAI) may be substantially complaint with the Internet Engineering Task Force Request For Comment (RFC) 4282 its predecessors or derivatives, as described above.

In one embodiment, the PNAE 210 may be configured to transmit an identity request to the ANAE 204. In one such embodiment, the subscriber may have requested access to a particular service (e.g., application 220). The service may require authentication and authorization that the subscriber is allowed to access the service. The PNAE 210 may facilitate this process. It is understood that other motivations and reasons behind the identity request may exist and that this is merely one illustrative example.

In one embodiment, the ANAE 204 may be configured to receive an identity request from the PNAE 210. In such an embodiment, the identity request may include the network address of the subscriber equipment. In one embodiment, the ANAE 204 may be configured to provide the identity of the subscriber equipment to the provider network authentication engine 210.

In one such embodiment, the ANAE 204 may be configured to, using the mapping of network address to actual-ID, provide the PNAE 210 with the actual-ID of the subscriber equipment. In one embodiment, as described above, the actual-ID may include a subscriber NAI. In yet another embodiment, the actual-ID may be a username (e.g., removing the domain portion of a NAI and returning the username portion), normal name and street address, ISP client ID, other sufficiently identifying value, etc.; although, it is understood that the above are merely a few illustrative examples to which the disclosed subject matter is not limited. In some embodiments, the identifier may be fetched from a local or remote repository (not shown).

Figure 3:
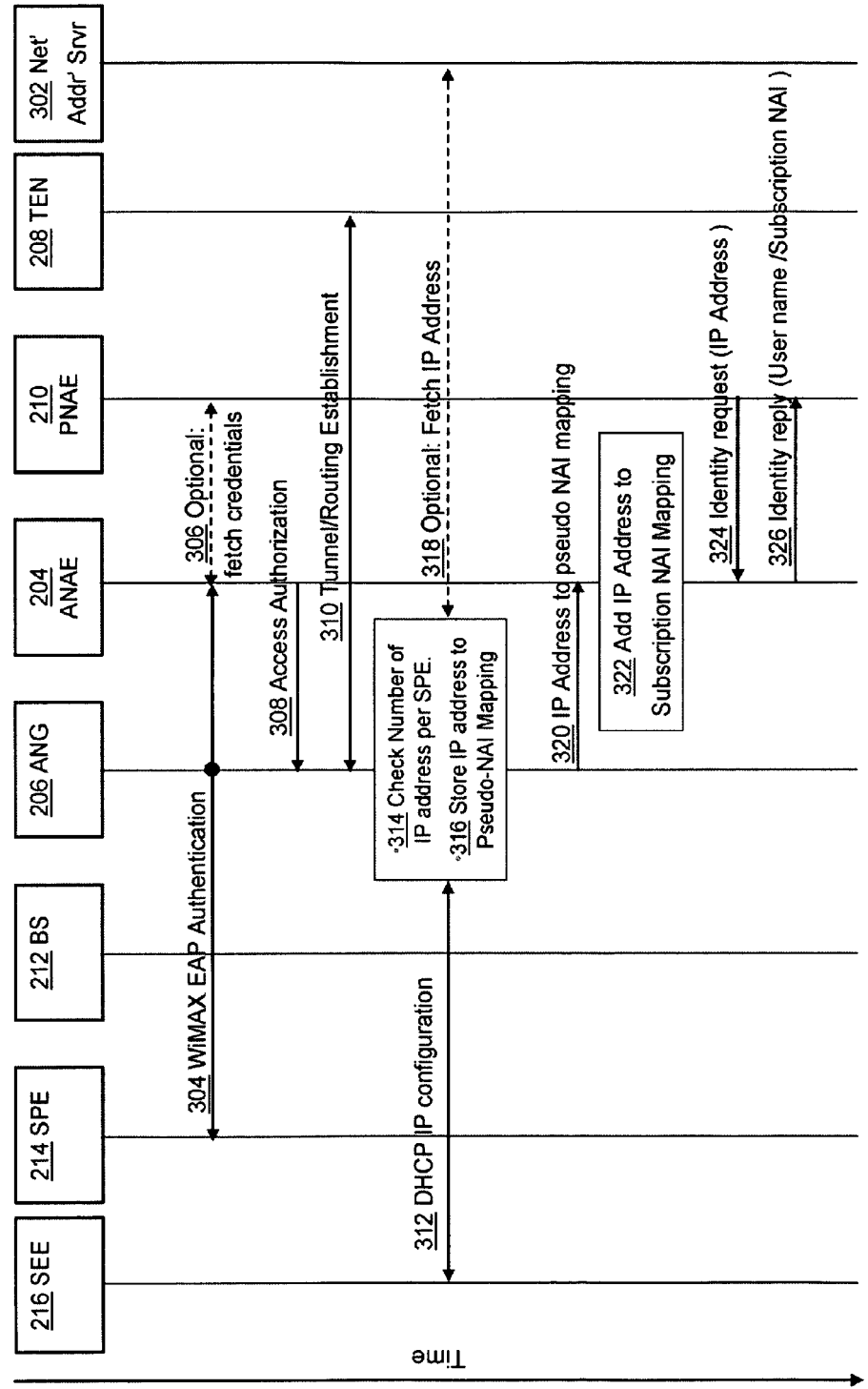
FIG. 3 is a timing diagram illustrating a system in accordance with the disclosed subject matter.

FIG. 3 is a timing diagram illustrating a system 300 in accordance with the disclosed subject matter. It is understood that the timing diagram of FIG. 3 is merely one specific illustrative embodiment, and that other embodiments are within the scope of the disclosed subject matter.

In various embodiments, the ANG 206 and/or the ANAE 204 or other devices may be pre-configured with various pieces of information to facilitate the performance of the following actions, described below. In this specific embodiment the pre-configuration may include: user/subscriber credentials, an ISP tunneling method and server address, IP Configuration Method and server address, Ethernet CS, the maximum number of dynamic IP addresses, a list of fixed IP addresses, etc.; although, it is understood that the above are merely a few illustrative examples to which the disclosed subject matter is not limited.

Action 304 illustrates that, in such an embodiment, the ANG 206 may perform subscriber or subscriber equipment authentication, as described above. In one embodiment, authentication may include use of the WiMAX Extensible Authentication Protocol (EAP), its predecessor, or derivatives. The Internet Engineering Task Force: Network Working Group, *Extensible Authentication Protocol (EAP)*, RFC 3748, June 2004. The ANAE 204 may facilitate this authorization, as described above. Action 306 illustrates that, in one embodiment, the ANAE 204 may fetch subscriber credentials from a PNAE 210.

Action 308 illustrates that, in one embodiment, the ANAE 204 may provide the ANG 206 with access authorization for the subscriber, as described above. In such an embodiment, the access authorization message may include tunneling addresses and technique identification. Action 310 illustrates that, in one embodiment, the ANG 206 may establish a tunnel, for the use of the subscriber, with the TEN 208, as described above.

Action 312 illustrates that, in one embodiment, the SEE 216 or other subscriber equipment may request a network address. In various embodiments, the subscriber equipment may use a protocol substantially in compliance with the Dynamic Host Configuration Protocol (DHCP), its predecessors, or derivatives. The Internet Engineering Task Force: Network Working Group, *Dynamic Host Configuration Protocol*, RFC 2131, March 1997. Action 314 illustrates that, in one embodiment, the ANG 206 may determine the number of network addresses allowed to the subscriber equipment (e.g., the SPE 214), as described above. Action 318 illustrates that, in one embodiment, the ANG 206 may request a network address, as needed, from a Network Address Server 302. In some embodiments, the Network Address Server 302 may be part of or in communication with the provider network 216 of FIG. 2. Action 316 illustrates that, in one embodiment, the ANG 206 may associate a network address with pseudo-ID and store the mapping, as described above. In such an embodiment, the pseudo-ID may include a pseudo or temporary-NAI, as described above.

Action 320 illustrates that, in one embodiment, the ANG 206 may communicate the network address(es) and pseudo-ID to the ANAE 204, as described above. Action 322 illustrates that, in one embodiment, the ANAE 204 may then map some or all of these values to an actual-ID, as described above. In various embodiments, the actual-ID may include a subscriber-NAI, as described above.

Action 324 illustrates that, in one embodiment, the PNAE 210 may issue or transmit an identity request to the ANAE 204, as described above. Action 326 illustrates that, in one embodiment, the ANAE 204 may transmit an identity reply to the PNAE 210, as described above. In some embodiments, the identity reply may include a username, an actual-ID, a subscriber-NAI, etc., as described above.

FIG. 4 is a flow chart illustrating the operation of an Access Network Authorization Engine in accordance with the disclosed subject matter. It is understood that FIGS. 4a and 4b represent a single flowchart illustrated on two pages. The connector 401 provides a way to represent the connection between the two pages. Hereafter and here-before, the flowchart of the technique 400 is simply referred to as FIG. 4, as if the flowchart merely occupied a single page.

Block 402 illustrates that, in one embodiment, a subscriber may be authenticated based upon one or more messages received from subscriber equipment. In one embodiment, the ANAE 204 of FIG. 2 may perform the authentication, as described above. In some embodiments, the subscriber equipment may include the SEE 216 or the SPE 214 of FIG. 2, as described above. In various embodiments, an authentication request may be made or forwarded by the ANG 206 of FIG. 2, as described above.

Block 404 illustrates that, in one embodiment, the credentials associated with the subscriber may be fetched from a provider network authentication engine. In one embodiment, the ANAE 204 of FIG. 2 may fetch the credentials, as described above. In one embodiment, the PNAE 210 of FIG. 2 may provide the credentials, as described above.

Block 406 illustrates that, in one embodiment, an access authorization message may be sent to an ANG authoring the subscriber equipment. In one embodiment, the ANAE 204 of FIG. 2 may send the access authorization message, as described above.

Block 408 illustrates that, in one embodiment, an access authorization message may be sent that includes an address of a tunnel endpoint node and a tunnel method identifier (ID) to be used by the ANG to establish a tunnel between the ANG and the tunnel endpoint node for the subscriber equipment. In one embodiment, the TEN 208 of FIG. 2 may be identified in the access authorization message, as described above.

Block 412 illustrates that, in one embodiment, a tunnel endpoint node may be selected from a plurality of tunnel endpoint nodes. In one embodiment, the ANAE 204 of FIG. 2 may perform the selection, as described above.

Block 414 illustrates that, in one embodiment, a tunnel method, to establish a tunnel between the ANG and the tunnel endpoint node, may be selected from a preconfigured group of tunnel methods. However, it is understood that in other embodiments other selection criteria and group of tunnel methods may be used and that the disclosed subject matter is not limited to this illustrative embodiment. In one embodiment, the ANAE 204 of FIG. 2 may perform the selection, as described above.

Block 416 illustrates that, in one embodiment, a set of network layer protocol configuration settings may be retrieved. In one embodiment, the ANAE 204 of FIG. 2 may perform the retrieval, as described above.

Block 418 illustrates that, in one embodiment, a subscription specific wireless access profile may be selected. In one embodiment, the ANAE 204 of FIG. 2 may perform the selection, as described above.

Block 420 illustrates that, in one embodiment, a convergence sub-layer subscription profile may be selected. In one embodiment, the ANAE 204 of FIG. 2 may perform the selection, as described above.

Block 410 illustrates that, in one embodiment, an access authorization message may be sent that includes the set of network layer protocol configuration settings, the subscription specific wireless access profile, and the convergence sub-layer subscription profile. In one embodiment, the ANAE 204 of FIG. 2 may send the message, as described above.

Block 452 illustrates that, in one embodiment, at least one network address and a pseudo-Identifier (ID) may be received from an Access Network Gateway (ANG). In various embodiments, one or more network address may be associated with the pseudo-ID. In one embodiment, the ANAE 204 of FIG. 2 may receive the data, as described above.

Block 454 illustrates that, in one embodiment, the at least one network address and the pseudo-Identifier may be mapped to an actual-Identifier. In various embodiments, one or more network addresses may be associated with the actual-ID. In one embodiment, the ANAE 204 of FIG. 2 may perform the mapping, as described above.

Block 456 illustrates that, in one embodiment, an identity request may be received. In various embodiments, the identity request may ask for the identity of the subscriber equipment. In some embodiments, the request may come from a provider network authentication engine (e.g., PNAE 210 of FIG. 2). In various embodiments, one or more network addresses may be associated with the actual-ID. In one embodiment, the ANAE 204 of FIG. 2 may receive the request, as described above.

Block 458 illustrates that, in one embodiment, the identity request may ask for the actual-ID (e.g., the subscriber NAI) of the subscriber equipment. In some embodiments, the request may include the network address of the subscriber equipment. In various embodiments, one or more network addresses may be associated with the actual-ID. In one embodiment, the ANAE 204 of FIG. 2 may receive the request, as described above.

Block 460 illustrates that, in one embodiment, the identity of the subscriber equipment may be provided in response to identity request. In one embodiment, the response may be provided to a PNAE (e.g., PNAE 210 of FIG. 2). In one embodiment, the ANAE 204 of FIG. 2 may provide the response, as described above.

Block 462 illustrates that, in one embodiment, the provided identity may be include the actual-ID of the subscriber equipment. In one embodiment, the ANAE 204 of FIG. 2 may provide the response, as described above.

FIG. 5 is a flow chart illustrating the operation of an Access Network Gateway in accordance with the disclosed subject matter. It is understood that FIGS. 5a and 5b represent a single flowchart illustrated on two pages. The connector 501 provides a way to represent the connection between the two pages. Hereafter and here-before, the flowchart of the technique 500 is simply referred to as FIG. 5, as if the flowchart merely occupied a single page.

Block 502 illustrates that, in one embodiment, an authentication of a subscriber from an Access Network Authorization Engine (ANAE) may be requested. In one embodiment, the ANAE 204 of FIG. 2 may receive the request, as described above. In some embodiments, the subscriber equipment may include the SEE 216 or the SPE 214 of FIG. 2, as described above. In various embodiments, an authentication request may be made or forwarded by the ANG 206 of FIG. 2, as described above.

Block 504 illustrates that, in one embodiment, an authentication request may be received from subscriber equipment (e.g., SEE 216 or the SPE 214 of FIG. 2), as described above. Block 506 illustrates that, in one embodiment, the authentication request may be forwarded to an ANAE. In various embodiments, an authentication request may be forwarded by the ANG 206 of FIG. 2, as described above.

Block 508 illustrates that, in one embodiment, an access authorization message may be received. In one embodiment, the received access authorization message may comprise an address of a tunnel endpoint node. In one embodiment, the ANAE 204 of FIG. 2 may transmit the access authorization message, as described above. In various embodiments, an access authorization message may be received by the ANG 206 of FIG. 2, as described above.

Block 510 illustrates that, in one embodiment, the received access authorization message may comprise a tunnel method identifier (ID). In various embodiments, an access authorization message may be received by the ANG 206 of FIG. 2, as described above.

Block 514 illustrates that, in one embodiment, a tunnel may be established between the Access Network Gateway and the tunnel endpoint node for the use of the subscriber or the subscriber equipment. In various embodiments, the ANG 206 of FIG. 2 may establish the tunnel, as described above.

Block 516 illustrates that, in one embodiment, a tunneling method based upon the tunnel method ID may be selected. In such an embodiment, the tunneling method may not be provided with the access authorization message. In various embodiments, the ANG 206 of FIG. 2 may make the selection, as described above. Block 518 illustrates that, in one embodiment, a tunnel may be established between the Access Network Gateway and the tunnel endpoint node for the use of the subscriber or the subscriber equipment. In various embodiments, the ANG 206 of FIG. 2 may establish the tunnel, as described above.

Block 520 illustrates that, in one embodiment, a tunnel may be established using a subscriber specific tunnel. In various embodiments, the ANG 206 of FIG. 2 may establish the tunnel, as described above.

Block 522 illustrates that, in one embodiment, a pseudo-Identifier may be associated with a subscriber. Block 524 illustrates that, in one embodiment, the pseudo-ID may be used to select a tunnel endpoint node. In such an embodiment, the tunnel endpoint node may not be provided with or as part of the access authorization message. In various embodiments, the ANG 206 of FIG. 2 may provide the association and selection, as described above.

Block 526 illustrates that, in one embodiment, a tunneling method to use when establishing a tunnel between the ANG and the tunnel endpoint node may be selected. In such an embodiment, the tunneling method may not be provided with or as part of the access authorization message. Block 528 illustrates that, in one embodiment, the selected tunneling method may be used when establishing a tunnel between the ANG and the tunnel endpoint node for the use of the subscriber. In various embodiments, the ANG 206 of FIG. 2 may provide the selection and establishing, as described above.

Block 552 illustrates that, in one embodiment, at least one network address may be assigned to the subscriber equipment. In one embodiment, the act of assigning may include the act of forwarding a network address that has been assigned by another device. In various embodiments, the ANG 206 of FIG. 2 may assign of forward the network address(es), as described above.

Block 554 illustrates that, in one embodiment, the assigned network address(es) may be associated with a pseudo-Identifier (ID). In various embodiments, the ANG 206 of FIG. 2 may make the association, as described above.

Block 556 illustrates that, in one embodiment, the network address(es) and the pseudo-ID may be transmitted to the Access Network Authorization Engine (ANAE). In various embodiments, the ANG 206 of FIG. 2 may make the transmission, as described above.

Block 558 illustrates that, in one embodiment, the data from subscriber equipment (e.g., SEE 216 and/or SPE 214 of FIG. 2) may be forwarded to a provider network (e.g., provider network of FIG. 2). In such an embodiment, the data may be transmitted to the provider network via the tunnel established between the ANG and the tunnel endpoint node. In various embodiments, the ANG 206 of FIG. 2 may forward the data, as described above.

Block 560 illustrates that, in one embodiment, the data from a provider network (e.g., provider network of FIG. 2) may be forwarded to subscriber equipment (e.g., SEE 216 and/or SPE 214 of FIG. 2). In such an embodiment, the data may be transmitted via the tunnel established between the ANG and the tunnel endpoint node. In various embodiments, the ANG 206 of FIG. 2 may forward the data, as described above.

Figure 6:
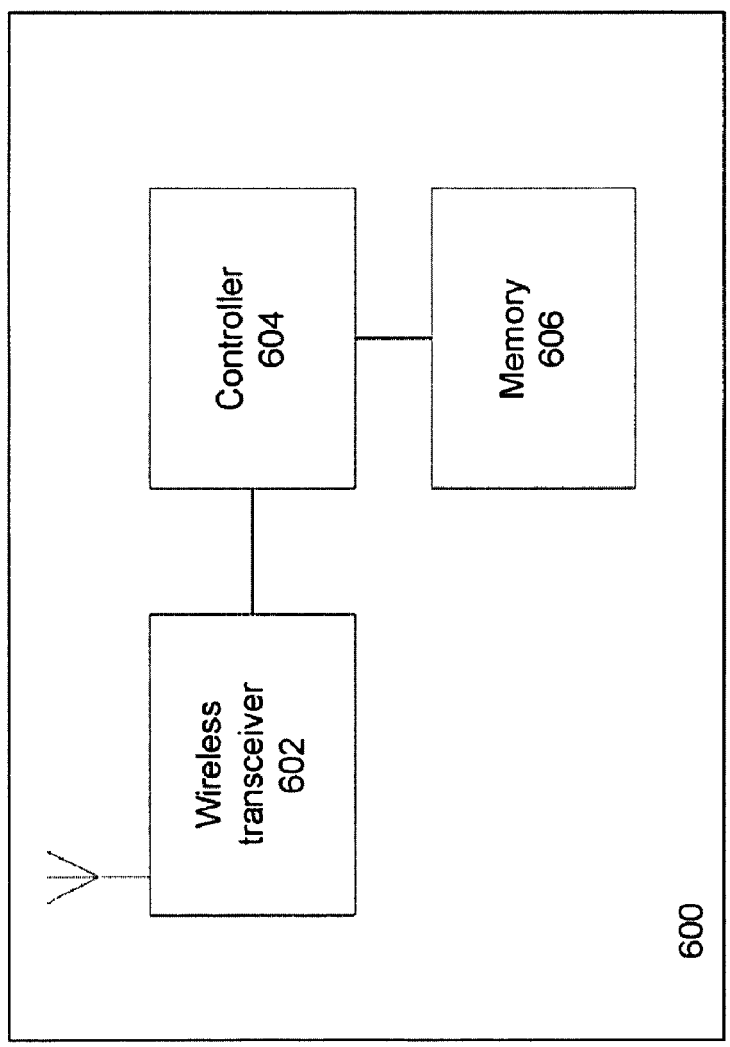
FIG. 6 is a block diagram of a wireless node according to an example embodiment.

FIG. 6 is a block diagram of a wireless node according to an example embodiment. The wireless node 600 may include a wireless transceiver 602, and a controller 604, and a memory 606. For example, some operations illustrated and/or described herein, may be performed by a controller 604, under control of software or firmware.

In addition, a storage medium may be provided that includes stored instructions, which when executed by a controller or processor may result in a controller, or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    authenticating a subscriber based upon one or more messages received from a subscriber equipment, via an Access Network Gateway (ANG);
    sending an access authorization message to the ANG authorizing the subscriber equipment; and
    wherein the access authorization message includes a subscription specific access profile that restricts how the subscriber equipment may use portions of an access network, the access authorization message also including an address of a tunnel endpoint node and a tunnel method identifier (ID) that includes a selected tunnel method from a preconfigured group of tunnel methods to be used by the ANG to establish a tunnel between the ANG and the tunnel endpoint node for the subscriber equipment.

2. The method of claim 1 wherein sending an access authorization message comprises:
    selecting a tunnel endpoint node from a plurality of tunnel endpoint nodes; and
    selecting a tunnel method to establish a tunnel between the ANG and the tunnel endpoint node from a preconfigured group of tunnel methods.

3. The method of claim 1 wherein sending an access authorization message comprises:
    retrieving a set of network layer protocol configuration settings;

selecting the subscription specific wireless access profile;

selecting a convergence sub-layer subscription profile; and transmitting the access authorization message, such that the access authorization message further includes:

the set of network layer protocol configuration settings, the subscription specific wireless access profile, and the convergence sub-layer subscription profile.

4. The method of claim 1 wherein authenticating a subscriber includes:

fetching a set of credentials associated with the subscriber from a provider network authentication engine.

5. The method of claim 1 further comprising:

receiving at least one network address and a pseudo-Identifier (ID) from a Access Network Gateway (ANG), wherein the network address(es) is associated with the pseudo-Identifier; and mapping the network address(es) and the pseudo-Identifier to an actual-Identifier.

6. The method of claim 1 further comprising:

receiving an identity request, to identify the subscriber equipment, from a provider network authentication engine; and providing the identity of the subscriber equipment to the provider network authentication engine.

7. The method of claim 6 wherein receiving an identity request includes:

receiving a query from a provider network authentication engine for the actual-Identifier, wherein the query includes the network address; and wherein providing the identity includes:

providing the actual-Identifier to the provider network authentication engine.

8. The method of claim 1 wherein sending an access authorization message includes: sending an access authorization message wherein the tunnel endpoint node address includes an address of a provider network gateway.

9. A method of using an Access Network Gateway (ANG) comprising:

requesting authentication of a subscriber from an Access Network Authorization Engine;

receiving an access authorization message from the Access Network Authorization Engine (ANAE), wherein the access authorization message comprises a subscription specific access profile that restricts how the subscriber equipment may use portions of an access network, the access authorization message also comprising an address of a tunnel endpoint node and a tunnel method identifier (ID) that includes a selected tunnel method from a preconfigured group of tunnel methods; and establishing a tunnel, using the selected tunnel method, between the ANG and the tunnel endpoint node for the use of the subscriber.

10. The method of claim 9 wherein requesting authentication includes:

receiving an authentication request from a subscriber equipment; and substantially forwarding the authentication request to the Access Network Authorization Engine.

11. The method of claim 9 further comprising:

assigning at least one network address to at least one subscriber equipment;

associating the assigned network address(es) with a pseudo-Identifier (ID); and transmitting the network address(es) and the pseudo-ID to the Access Network Authorization Engine (ANAE).

12. The method of claim 9 further comprising:

forwarding data from a subscriber equipment to a provider network, wherein the data is transmitted to the provider network via the tunnel established between the ANG and the tunnel endpoint node; and forwarding data from the provider network to the subscriber equipment, wherein the data was received from the provider network via the tunnel established between the ANG and the tunnel endpoint node.

13. The method of claim 9 wherein establishing a tunnel includes establishing a subscription specific tunnel.

14. The method of claim 9 where establishing a tunnel comprises:

associating a pseudo-Identifier (ID) with a subscriber;

using the pseudo-ID to select a tunnel endpoint node;

selecting a tunneling method to use when establishing a tunnel between the ANG and the tunnel endpoint node; and using the selected tunneling method when establishing a tunnel between the ANG and the tunnel endpoint node for the use of the subscriber.

15. The method of claim 9 wherein receiving the access authorization message comprises:

receiving a tunnel method identifier (ID) as part of the access authorization message, and receiving the address of a tunnel endpoint node as part of the access authorization message; and wherein establishing a tunnel comprises:

selecting a tunneling method based upon the tunnel method ID, and establishing a tunnel between the ANG and the tunnel endpoint node at the address indicated by the access authorization message.

16. The method of claim 9 wherein establishing a tunnel comprises:

establishing a first unidirectional tunnel from the ANG to the tunnel endpoint node; and establishing a second unidirectional tunnel from the tunnel endpoint node to the ANG;

wherein, taken as a whole, the first and second unidirectional tunnels function as a bidirectional tunnel between the ANG and the tunnel endpoint node.

17. A system comprising:

an Access Network Authorization Engine comprising a processor configured to execute a computer program, wherein the Access Network Authorization Engine is configured to, when executing the computer program:

authenticate a subscriber based upon one or more messages received from a subscriber equipment, provide an access authorization message to an Access Network Gateway (ANG), wherein the access authorization message includes a subscription specific access profile that restricts how the subscriber equipment may use portions of an access network, the access authorization message also including an address of a tunnel endpoint node and a tunnel method identifier (ID) that includes a selected tunnel method from a preconfigured group of tunnel methods; and the Access Network Gateway (ANG) comprising a processor configured to execute a computer program, wherein the ANG is configured to, when executing the computer program:
establish a tunnel, using the selected tunnel method, between the ANG and the tunnel endpoint node for the use of the subscriber.

18. The system of claim 17 wherein the Access Network Gateway (ANG) is further configured to:
associate a pseudo-Identifier (ID) with the subscriber,
associate a network address with the subscriber equipment, and
transmit the pseudo-ID and the network address to the Access Network Authorization Engine;
and
wherein the Access Network Authorization Engine is further configured to:
map the network address and the pseudo-ID to an actual-ID.

19. The system of claim 18 wherein the Access Network Authorization Engine is further configured to:
in response to a request, provide the actual-ID to a provider network authentication engine.

20. The system of claim 17 wherein the Access Network Authorization Engine is further configured to:
provide, as part of the access authorization message, the Access Network Gateway (ANG) with a set of network layer protocol configuration settings, a subscription specific wireless access profile, and a convergence sublayer subscription profile.

21. An apparatus comprising:
at least one processor; and
at least one memory including program instructions, wherein the at least one memory and the computer program code are configured, with the at least one processor, to cause the apparatus to:
authenticate a subscriber based upon one or more messages received from a subscriber equipment, via an Access Network Gateway (ANG);
send an access authorization message to the ANG authorizing the subscriber equipment,
wherein the access authorization message includes an address of a tunnel endpoint node and a tunnel method identifier (ID) that includes a selected tunnel method from a preconfigured group of tunnel methods to be used by the ANG to establish a tunnel between the ANG and the tunnel endpoint node for the subscriber equipment;
receive at least one network address and a pseudo-Identifier (ID) from a Access Network Gateway (ANG), wherein the network address(es) is associated with the pseudo-Identifier; and
map the network address(es) and the pseudo-Identifier to an actual-Identifier.

* * * * *